(12) United States Patent
Abu-Romeh et al.

(10) Patent No.: US 12,061,179 B2
(45) Date of Patent: Aug. 13, 2024

(54) CHROMATOGRAPHY COLUMN WITH DUAL-PURPOSE VALVE ASSEMBLY

(71) Applicant: TOSOH CORPORATION, Yamaguchi (JP)

(72) Inventors: Ahmad Abu-Romeh, London (CA); Amer Ebied, London (CA)

(73) Assignee: TOSOH CORPORATION, Yamaguchi (JP)

( * ) Notice: Subject to any disclaimer, the term of this patent is extended or adjusted under 35 U.S.C. 154(b) by 702 days.

(21) Appl. No.: 17/279,710

(22) PCT Filed: Oct. 11, 2019

(86) PCT No.: PCT/CA2019/051453
§ 371 (c)(1),
(2) Date: Mar. 25, 2021

(87) PCT Pub. No.: WO2020/073136
PCT Pub. Date: Apr. 16, 2020

(65) Prior Publication Data
US 2021/0396723 A1 Dec. 23, 2021

Related U.S. Application Data

(60) Provisional application No. 62/744,212, filed on Oct. 11, 2018.

(51) Int. Cl.
*B01D 15/14* (2006.01)
*B01D 15/22* (2006.01)
(Continued)

(52) U.S. Cl.
CPC ......... *G01N 30/6026* (2013.01); *B01D 15/14* (2013.01); *B01D 15/22* (2013.01); *G01N 2030/027* (2013.01)

(58) Field of Classification Search
CPC ........ G01N 30/02; G01N 30/50; G01N 30/56; G01N 2030/562; G01N 2030/565;
(Continued)

(56) References Cited

U.S. PATENT DOCUMENTS

| 6,123,849 A | 9/2000 | Purdom |
| 8,702,983 B2 | 4/2014 | Gebauer |

(Continued)

FOREIGN PATENT DOCUMENTS

| CN | 1997432 A | 7/2007 |
| EP | 2081659 B1 | 7/2009 |

(Continued)

OTHER PUBLICATIONS

International Search Report issued on Dec. 10, 2019 in respect of corresponding PCT International Patent Application No. PCT/CA2019/051453 filed Oct. 11, 2019.

(Continued)

*Primary Examiner* — Jill A Warden
*Assistant Examiner* — Michael Stanley Gzybowski
(74) *Attorney, Agent, or Firm* — Stratford Group Ltd.

(57) ABSTRACT

The present invention discloses methods for packing chromatography columns using dual-purpose valve assemblies. The key components of the dual-purpose valve comprise of the following; the inlet port (224) which sits on the first adaptor (212), the hollow nozzle (320) which passes through the first adaptor (212) cavity and is closed on the bottom end, and the internal movable plug (322). Different components of our de-vice work in way that the mobile phase and analyte(s) distribution is not blocked in the centre of the column, allowing for a uniform and homogeneous fluid distribution. This simple yet novel design offers uniform fluid distribution, stable packed bed, eliminates any void volume, and prevents bacterial contamination/growth. Ease (Continued)

of use, scalability, ease of cleaning, cost-efficiency and fine-tuning packing conditions such as pressure are key features of this invention.

19 Claims, 10 Drawing Sheets

(51) Int. Cl.
*G01N 30/60* (2006.01)
*G01N 30/02* (2006.01)

(58) Field of Classification Search
CPC .... G01N 30/6004; B01D 15/10; B01D 15/22; B01D 15/14; F16K 1/00; F16K 1/32; F16K 3/22; F16K 3/24
See application file for complete search history.

(56) References Cited

U.S. PATENT DOCUMENTS

| | | |
|---|---|---|
| 8,778,187 B2 | 7/2014 | Gebauer |
| 9,527,009 B2 | 12/2016 | Gebauer |
| 9,597,610 B2 | 3/2017 | Gebauer |
| 10,048,235 B2 | 8/2018 | Gebauer |
| 10,188,964 B2 | 1/2019 | Witt et al. |
| 2008/0017579 A1 | 1/2008 | Hermansson et al. |
| 2008/0264837 A1 | 10/2008 | Agee et al. |
| 2013/0193052 A1 | 8/2013 | Witt et al. |
| 2015/0360145 A1 | 12/2015 | Hofmann |

FOREIGN PATENT DOCUMENTS

| | | |
|---|---|---|
| EP | 2081660 B1 | 7/2009 |
| GB | 392975 A | 6/1933 |

OTHER PUBLICATIONS

Extended European Search Report dated Mar. 18, 2022 in respect of corresponding European Patent Application No. 19870649.1 filed Feb. 11, 2021, 8 pages.

Office Action dated Apr. 28, 2022 in respect of corresponding Chinese Patent Application No. 201980064537.5 filed Mar. 30, 2021, 22 pages.

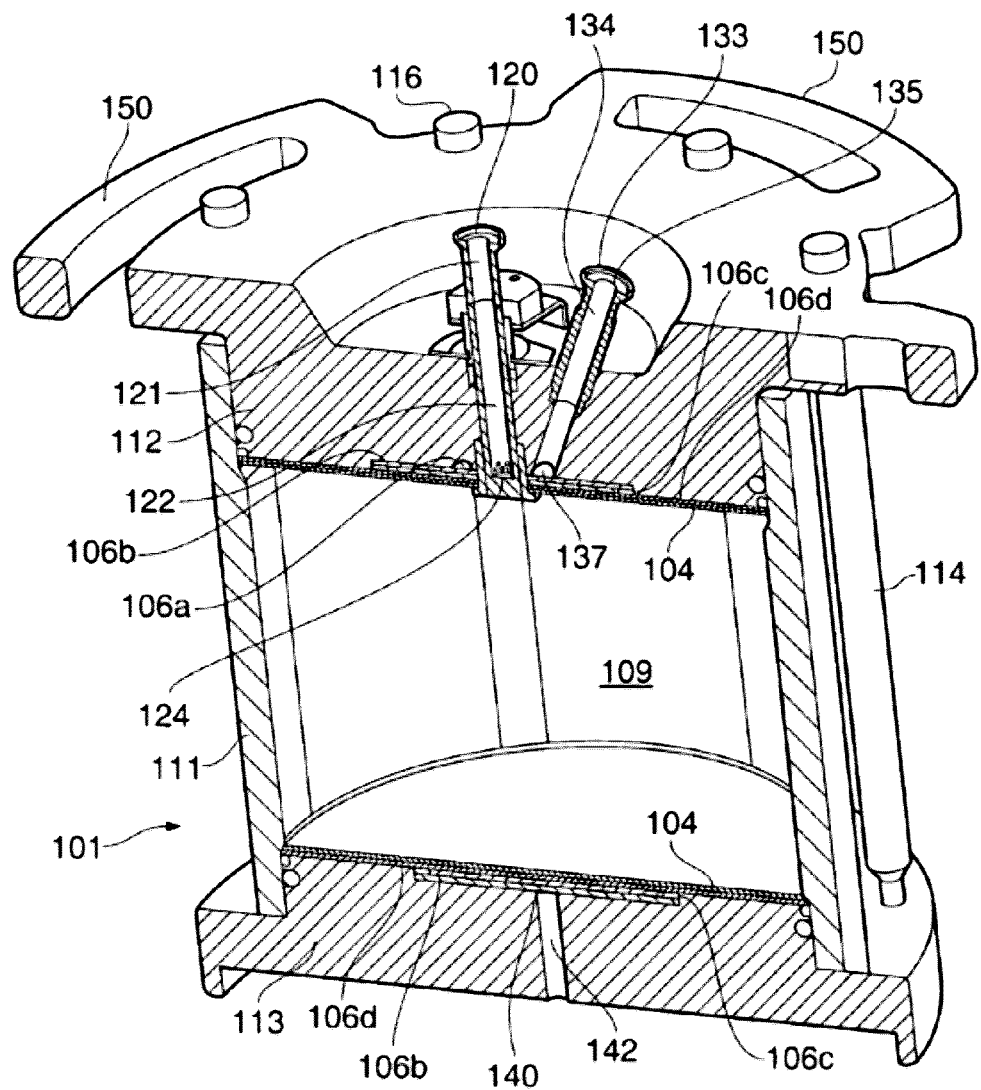
Figure 1 – PRIOR ART

CHROMATOGRAPHY COLUMN WITH DUAL-PURPOSE VALVE ASSEMBLY

FIELD OF THE INVENTION

The present disclosure relates generally to chromatography columns and more specifically packing chromatography columns using dual-purpose valve assemblies and methods of use and manufacture of the same.

BACKGROUND

Chromatography is a well-established and valuable technique for separating one or more components from multi-component chemical and biological mixtures and is widely used in research and industry, finding many applications in compound preparation, purification and analysis. There are many different forms of chromatography, column chromatography being of particular importance in the chemical, pharmaceutical and biological industries for the preparation, purification and characterization of chemical compounds, proteins, antibodies, peptides and nucleic acids.

Column chromatography relates to a separation and/or purification technique in which a stationary "packed bed" of a "packing medium" or "resin" is contained within a rigid tube. The packing medium can be in the form of particles of a solid ("stationary phase") or a solid support material coated with a liquid stationary phase.

The main components of a chromatography column include a column vessel, which is often made of metal or glass or highly rigid plastic material, upper and lower caps (adaptors), and a pair of flow distributors, which are typically inserted into the two ends of the column vessel to form a space or chamber in the vessel between the flow distributors into which the packing medium is loaded.

The tubular body of the chromatography column is often vertically oriented enclosing the packing medium between a fixed lower cap and a movable upper cap. The particulate packing medium, usually resin particles, is often suspended to form a slurry, which is then pumped, poured or sucked into the column. The packing medium is typically introduced into the column through the open upper end of the column to form a packed bed by means of settling, flow packing, axial compression, or a combination of these.

After the column is filled with the packing medium, the upper cap is secured in place preferably to remove all air from the column. The carrier liquid "mobile phase/eluent", containing the "analyte(s)" compounds or molecules to be separated, enters through an inlet port. The inlet port is often at the top of the column and the analyte(s) usually passes through a porous, perforated "filter", such as a screen, mesh or frit. The filter acts as support for the packed bed, to keep the resin from escaping through the inlet or outlet ports, and only allow liquid mobile phase or analyte(s) to pass through. The analyte(s) moves through the bed of packing medium and is removed via an outlet port, often at the base of the column and through a second filter, screen, mesh or frit.

As the dissolved analyte(s) passes through the column with the mobile phase, different compounds in the analyte(s) can associate differentially with the stationary phase such that they are adsorbed relative to the mobile phase and move through the column at different speeds. Thus, those compounds that associate more with the stationary phase travel more slowly through the column than those that associate less, and this speed differential results in separation of the compounds from one another as they pass through and exit the column. Features of the stationary phase that promote differential association include but are not limited to ionic charge (ion exchange chromatography), hydrophobicity (hydrophobic interaction chromatography and reversed phase chromatography), and porosity (size exclusion chromatography).

In yet another type of column chromatography known as affinity chromatography, the packing medium includes binding agents, such as antigens, antibodies, or ligands, that recognize a specific molecular conformation and bind to one or more desired compounds or molecules in the dissolved analyte(s). Thus, as the dissolved analyte(s) flows through the packing medium only the desired compounds or molecules remain in the column. A subsequent flow through the packing medium of a different mobile phase that disrupts the molecular recognition, separates the desired compounds or molecules from the binding agents attached to the packing medium, or separates the binding agents from the packing medium. The desired compounds or molecules are rinsed out of the column and collected in the eluting fluid. Affinity chromatography can be used in a variety of applications, including nucleic acid purification, protein purification from cell free extracts, and purification from blood.

There are numerous factors in the physical orientation of the column and packing of the resin bed that are critical to the success of the separation of mixtures when using a chromatography column. Typically, the diameter of the column is chosen to correspond to the quantity of the analyte(s), and the length of the column depends on the difficulty of separation and the resin type, and the pressure limitation of the resin itself or the apparatus. The packing medium or resin is selected with functional groups that interact with molecules or compounds in the analyte(s), or in the case of gel exclusion chromatography also known as size exclusion chromatography (GPC/SEC), having pores of sufficient size to be able to retain smaller moieties in the analyte(s) to be analyzed.

Column packing is a critical step, as a poorly packed bed leads to uneven flow and band broadening, both of which give rise to poor and ineffective separation. There are two common ways to pack a chromatography column bed. One is a dry packing method wherein dry solid phase packing medium/resin is introduced into the column and packing buffer is used at high flow rates to hydrate the medium. The second approach is a wet packing method, wherein packing buffer is mixed with the dry medium to form a resin slurry which is then introduced into the column at certain pressures suitable for the type of resin. This can be followed by an axial compression step in order to maintain homogenous axial pressure in the packed bed.

It is crucial that the medium is evenly packed and that there are no air pockets or irregularities in the packed bed. Homogenous packing in both axial and lateral directions maximizes the contact of the analyte(s) with the packing medium which results in effective separation. Different types of resins have different compressibility. Therefore, in order to achieve a tightly packed bed, the resin has to be packed at a certain pressure suitable for the packing medium, and the pressure has to remain constant throughout the bed for the packing to remain stable.

When packing columns, a small space or void can form in different places including the outer edge of the flow distributors and the inner wall of the column. This void space creates a so-called "dead zone" or "dead space", as the mobile phase does not reach it, and into which fluids and contaminants can enter and become entrapped and stagnant, rather than flowing through the medium within the column tube. In addition, such dead zones are prone to contamination and bacterial growth as they are difficult to clean in cleaning cycles after packing the column or when columns are to be reused.

Once the column is packed, the analyte(s) to be separated are introduced into the column. For an effective separation it is essential for the analyte(s) to be uniformly distributed, particularly as the cross-section of the chromatographic column increases. The efficiency of the chromatographic separation relies on the liquid distribution and collection system at the fluid inlet and outlet of the packed bed. Ideally, the eluent/mobile phase is uniformly introduced throughout the surface at the top of the packing medium, and it flows through the packing at the same velocity throughout the packed bed's cross section, and is uniformly removed at the plane defined by the bottom of the packed bed.

A disposable column is characterized by a preassembly of the chromatography medium in order to reduce installation and qualification work otherwise required with non-disposable columns. As a minimum, the preassembly involves the formation of the bed of resin (pre-packing). Additional pre-treatment can include reduction of microbiological burden, sterilization, depyrogenation etc. Disposable columns may be used as single-use columns, which means that the user is not performing cleaning regimes that require qualification (e.g. testing, validation, etc.) of the packed bed before repeated use. Thus, single-use could mean a campaign of runs in the same conditions.

Since disposable columns are intended for limited time use, it is important that they are made of parts that are cost-efficient and simple to fabricate, yet, maintain the same robustness and functional integrity of a reusable column. Factors such as homogeneity of the packing, stability of the packed bed, absence of any dead zones, and proper distribution of the analyte(s) are relevant and crucial. In addition, it is essential to have a reproducible and efficient column packing process/method and for the packed bed to remain stable and aseptic during shipping and operation.

Numerous columns have been designed and manufactured with the attempt to meet the desired factors mentioned above. Example are provided below.

U.S. Pat. No. 10,188,964B2 (Repligen Corporation) discloses the manufacture of chromatography column tubes from plastic/thermoplastic or composite materials (such as polypropylene (PP), polyethylene (PE), polyamides, acetals, or glass-filled plastics, such as glass-fiber plastics). Securing at least one of two flow distributors within the column tube with a tight interference or press fit, results in chromatography columns with reduced or no dead zones around the press fit flow distributor and have an infinitely adjustable packing medium volume.

This design is used for making a pre-packed disposable column. However, the corresponding material and manufacturing costs are high. Also, the column starts with a long tube that is double the length of the final column with a fixed adaptor/cap on one end. Then the column is filled with resin slurry, and the top adaptor is placed and compressed into the tube using specialized equipment, until the final column "Bed Height" is reached. The column performance is then tested, and the adaptor maybe compressed further if needed, but cannot be decompressed without damaging the column. Once the test results are satisfactory, the extra length of the tube comprising the wall of the column is cut, and the top adaptor is welded to the tube.

U.S. Pat. No. 6,565,745 (Isco) discloses a preparation of a novel disposable chromatographic column. These disposable columns are manufactured of inexpensive plastics and designed to be easily assembled. A cap on one end of the column is part of the molded tube, the body of the column is filled with the desired packing and thru the open end, then the open end is capped with simple linear motion, sealing by a tight fit, with the aid of detents and cantilever to keep the cap closed and counterpart the snap stress. Additionally, integral channels for distributing the analyte radially are part of the molded cap.

Columns with this design can only be packed using the dry packing method, which is very time consuming and offers low reproducibility of packing. Also, with the snap fit cap using cantilevers and detents, the distance of travel of the snap cap is predetermined, leaving very low flexibility in the compression distance.

In addition, since the end cap is molded part of the tube, the manufacturing of hardware is expensive for a disposable column. Furthermore, knowing that different resins require different bed heights, with this column design, making columns of the same inner diameter but different bed heights is extremely expensive. Also, integral channels on the inlet cap for distributing the analyte radially are part of the mold (cap plus tube), that are expensive to make.

Furthermore, the filter is only held in place by the packed bed and there is no sealing between filter and tube body, enabling the leakage of the resin. Also, the filter could be displaced or tilted if the column is operating at high flow rates.

The ability to pack the column using a valve placed in the upper adaptor/cap allows to pack the column while assembled. This offers many advantages including packing the column in aseptic conditions, which is critical for both pre-packed disposable columns and reusable columns. Moreover, it enables formation of a homogeneously packed bed at a desired packing pressure that is suitable for the packing medium/resin. Additionally, the column can be packed using regular pressure pumps, such as a peristaltic pump, without the need of using expensive apparatus.

U.S. Pat. No. 5,902,485 (Amersham Pharmacia Biotech) discloses an access valve suitable for controlling fluid flow into and out of a chromatography column that has a relatively movable valve elements preferably represented by a central axially movable probe with a head acting as a spool valve in a barrel. Axial movement of the probe adjusts the valve between a fully open condition, in which both a first conduit extending through the probe and a second conduit defined around the probe are open to the column interior, and a partly open condition in which a sealing component of the probe closes the second conduit. Also, further axial movement of the probe provides a fully closed position in which both conduits are closed. The partly open position is useful for packing chromatography media into its column while the third position is convenient for unpacking the same. When valve is closed, the first and second conduits communicate with one another so that the valve interior can be cleaned while the column is operating.

Although this access valve offers performance and technical advantages, it has a complex design, which is expensive to fabricate especially for disposable columns. It has too many movable parts, hence, many seals, and potential leakage overtime. The valve sits under the top part of the wall, hence, not movable, and bed height is restricted within the top and bottom valves. In addition, after packing the column and retracting the probe there will be a void area, which can cause bed instability or promote bacterial growth. Also, the mobile phase inlet delivers the flow to an annulus shape around the central orifice in order to distribute the flow symmetrically, but no flow goes to the center of the column, which leads to non-homogenous distribution of analyte(s).

U.S. Pat. No. 8,585,894 (GE Healthcare) discloses a nozzle assembly comprising a nozzle tube through which chromatography media slurry is to be provided to the column. According to the invention said nozzle assembly further comprises a pivot connected in a first end to a pivot arm, said pivot can be pivoted into at least two different locked positions such that a nozzle tip is adjusted into at least two different locked nozzle tip positions. This nozzle can be used with a chromatography column for packing, unpacking, and running analytes through the column. Therefore, it is designed for reusable columns where the column is unpacked and repacked again. The column has a separate inlet for analyte(s), which is oriented at an angle, which could lead to non-homogenous distribution of analyte(s). Moreover, with the moveable packing/unpacking central tip, the centre of the column is inaccessible by the analyte(s). The nozzle tip will, however, create a void area once retracted after packing. Also, a movable nozzle tip containing many O-rings makes the valve prone to seal failure and subsequent leaking. In addition, a separate packing/unpacking nozzle tube is hard to clean as it cannot be back-flushed after packing.

US2008/0017579A1 (GE Healthcare) discloses a column with a slurry filling valve that is incorporated in a pre-packed disposable column. The invention disclosed a column comprising a first port for mobile phase and a transverse fluid distribution channel for distributing fluid uniformly throughout the packed bed. The first port comprises an inlet and an outlet having a passageway there between, the outlet having an asymmetric configuration relative to the fluid distribution channel.

In this configuration, there is a central port comprised of valve and nozzle, for introducing the slurry in the column. The nozzle is retracted after pumping the resin slurry, which would leave dead space in the column. Also, the packing valve is hard to clean after pumping the resin slurry as it cannot be back flushed and would create a potential environment for bacterial contamination. In addition, the analyte(s) is introduced in the column via a different port that is oriented at an angle and does not introduce the analyte(s) into the center of the column. With the slurry valve occupying the central area of the column, the analyte(s) will not reach the center of the column and the distribution of the analyte(s) will be ineffective/non-homogeneous, leading to reduced efficiency of the distributor. Moreover, the existence of multiple ports enhances the possibility of bacterial contamination. Finally, axial compression is obtained via external mechanism, which is costly, and does not provide reproducible packing column-to-column.

U.S. Pat. No. 8,377,296 (GE Healthcare) incorporates an improvement to the invention described in the above patent application (US2008/0017579). The improvement relates to the filter/frit holder bracket having channels in order to reduce the area blocked by the resin valve. However, this improvement has some drawbacks, mainly that resin particles are still able to enter the channels in the holder bracket. Moreover, whilst the filter/frit may prevent the particles from reaching the area above it, the particles will still be able to pass around the filter/frit. Also, this design limits the column from running in the upflow, as this will push a lot of particles into channels in the holder bracket and thus plug them.

EP 2081660 (GE Healthcare) discloses an axial flow chromatography column comprises two opposed axially spaced end units separated by a sidewall of a housing. A filter is adjacent to each end unit. The filters together with the sidewall define an enclosed bed space for containing a bed of particulate medium. Each end unit comprises a port in fluid communication with the enclosed bed space for adding or removing liquid from the bed space. In a preferred embodiment, the two ports are at the same level or elevation above the level of the bed space.

EP 2081659 (GE Healthcare) discloses an axial flow chromatography column comprises a port of an end unit adjacent or comprising a transverse fluid distribution channel. The port comprises an inlet and a single outlet having a passageway. The single outlet is in direct fluid connection with the fluid distribution channel. The outlet has an asymmetric configuration relative to the fluid distribution channel wherein the first port is arranged such that it is not interconnected with the valve means structure.

U.S. Pat. No. 6,576,124 (Amersham Pharmacia Biotech) discloses a chromatography column that includes a net to prevent media from escaping from the end cells which are used for radially distributing the fluid flowing in from a central inlet at one end of the column and for radially collecting the fluid for subsequent outputting from a central outlet at the opposite end of the column. The net and/or bed support is integrally joined to a net retaining means, preferably a sleeve that protrudes through the column end plate, and/or to a net retaining circumferential ring. The retaining means are held in place by the valve block but being free to rotate with respect to the valve block.

U.S. Pat. No. 6,942,794 (Millipore Corp) discloses a flow distributor for a chromatography column that has a high ratio of exposed distributor surface to the packed bed and is capable of withstanding high velocity flows with minimal pressure drop. The column has top and bottom faces; inlet extending through flow distributor and a bottom face across which is secured a bed support; bed support secured to flow distributor adjacent its bottom face about its outer periphery; and distribution disk arranged over inlet and extending across 1-30% of flow distributor's bottom face area.

In spite of all of the research and developments in the field of column chromatography, and the many proposed inventions/products, there is a need for an effective, yet simple and cost-efficient packing method that will permit homogenous resin packing and uniform distribution while applying the analyte(s). Particularly, in packed columns the main challenges include; packing the bed at a certain pressure and maintaining particles compressed, achieving a uniform bed with no void space, and obtaining homogeneous distribution of the analyte(s) throughout the packed bed. Also, in case of columns with a slurry packing valve, a simple and easy to clean valve design is needed that would eliminate formation of any void volume and would not hinder the distribution of analyte(s). In addition to the above, for a pre-packed disposable column, the valve, the other components of the column hardware, and packing methods must produce columns that are feasible and robust offering the same functional integrity as reusable columns.

The content of all documents referred to are hereby incorporated by reference in their entirety for all purposes.

Definitions

"Analyte" shall be defined as a substance, compound or chemical of natural or synthetic origin, or a reaction product or derivative or metabolite thereof. For the avoidance of doubt, the term shall include biological molecules, such as proteins, peptides, amino acids and nucleic acids, and synthetic molecules Such as drugs and/or pro-drugs.

"Mobile phase"/"eluent" is the carrier liquid that flows through the chromatography columns and carries the analyte(s) through the column.

"Resin"/"packing medium" defines the particles that the column is packed with.

"Resin slurry" is the form the resin is made in when pumping or pouring the packing in the column.

"Packed bed" is the arrangement of resin particles in a chromatography column, usually compressed at a certain pressure suitable for the resin particles and running conditions, in order to keep them stable in place.

"Packing buffer" is the liquid that the resin is mixed with in order to form a resin slurry that is pumped, sucked, or poured in the packed bed space to form a packed bed.

"Bed height" is the vertical distance that the packed bed occupies in the chromatography column, usually defined as the distance between the upper and lower porous filters/frits.

"Distribution channel" refers to structures through which fluids are introduced to an enclosure or bed space for a packed bed of chromatography medium from a cross-sectional zone.

"Dead zone"/"dead space" is a pocket of volume that the mobile phase is not able to reach to, making it hard to clean and resulting in potential bacterial contamination/growth.

A "disposable column" is characterized by a pre-treatment/preassembly of the chromatography medium in order to reduce installation and qualification work otherwise required with non-disposable columns. As a minimum, the pre-treatment involves the formation of the bed of resin. Additional pre-treatment can be reduction of microbiological burden, sterilization, depyrogenation, etc.

Disposable columns may be used as single-use columns, which means that the user is not performing cleaning regimes that require qualification (e.g. testing, validation, etc.) of the packed bed before repeated use. Single-use can include a campaign of runs in the same chromatographic conditions. One embodiment of a disposable column is a complete column that is delivered pre-packed with chromatography medium.

A "filter" refers to a structure such as a mesh, net, frit or others, which has pores or channels smaller than the resin particles in the packed bed. The "filter" act as a support for the packed bed, and prevents resin particles from escaping through the upper or lower ports of the column.

A "moveable mechanism" refers to means of blocking the flow of a mobile phase, typically a resin or an analyte. The mechanism can take many forms, including a plug sized to move axially up and down the inside of the nozzle that is used to pack and run the column. The mechanism can also be a sleeve that is sized to move axially up and down the inside or outside of the nozzle. The plug or sleeve may have holes in it that correspond in their position to holes on the nozzle.

"Sealing means" refers to ways of preventing liquid or resin from exiting an area through space between adjacent parts. Sealing can be achieved by adding a gasket, O-ring, X-ring, or others. Sealing means can also act as support to hold a part in place and preventing it from movement, dislocation, or deflection.

BRIEF SUMMARY

In accordance with an aspect of the current invention there is provided a chromatography column with dual-purpose valve assembly.

In accordance with an embodiment of the present invention there is provided a dual-purpose valve assembly for use in a chromatography column, said column having a first adapter adjacent to a first filter, a second adaptor adjacent to a second filter, and a side wall, positioned between the first and second adapters thereby defining a bed space, said assembly comprising: an inlet port which is positioned on the first adaptor of said column, and an outlet port which is positioned on the second adapter of said column; a hollow nozzle, connected to the inlet port, said nozzle having an inside surface and an outside surface, said nozzle passing through the first adaptor and adjacent first filter, said nozzle having an upper set of one or more through holes above the first filter and a lower set of one or more through holes below the first filter, and a closed bottom end; a moveable mechanism that is movable from a first upper position wherein a set of one or more through holes on the nozzle are blocked and the lower set of one or more through holes on the nozzle are open and in fluid communication with the bed space, to a second lower position wherein the upper set of one or more through holes on the nozzle are in fluid communication with the bed space via the first filter, and the lower set of one or more through holes on the nozzle are blocked; and one or more sealing means positioned between the first adaptor and the nozzle, the nozzle and the first filter.

In accordance with an additional embodiment of the present invention there is provided a dual-purpose valve assembly for use in a chromatography column, said column having a first adapter adjacent to a first filter, a second adaptor adjacent to a second filter, and a side wall, positioned between the first and second adapters thereby defining a bed space, said assembly comprising: an inlet port which is positioned on the first adaptor of said column, and an outlet port which is positioned on the second adapter of said column; a hollow nozzle, connected to the inlet port, said nozzle having an inside surface and an outside surface, said nozzle passing through the first adaptor and adjacent first filter, said nozzle having an upper set of one or more through holes above the first filter and a lower set of one or more through holes below the first filter, and a closed bottom end; a moveable plug or sleeve, sized respectively for reciprocating axial movement along the inside surface or outside surface of the nozzle, said movable plug or sleeve being movable from a first upper position wherein the upper set of one or more through holes on the nozzle are blocked and the lower set of one or more through holes on the nozzle are open and in fluid communication with the bed space, and a second lower position wherein the upper set of one or more through holes on the nozzle are in fluid communication with the bed space via the first filter, and the lower set of one or more through holes on the nozzle are blocked; and one or more sealing means positioned between the first adaptor and the nozzle, the nozzle and the first filter.

In accordance with an additional embodiment of the present invention there is provided a A chromatography column comprising: a side wall; axially spaced first and second adaptors positioned opposed to each other and being separated by said side wall; a first filter, which is adjacent to said first adaptor, and a second filter, which is adjacent to said second adaptor, wherein said first and second filters together with the side wall define an enclosed bed space for containing a bed of particulate medium therein; an inlet port positioned on the first adapter; an outlet port positioned on the second adapter, configured to collect analyte; a hollow nozzle, connected to the inlet port, said nozzle having an inside surface and an outside surface, said nozzle passing through the first adaptor and first filter, said nozzle having an upper set of one or more through holes above the first filter and a lower set of one or more through holes below the first filter, and a closed bottom end; a moveable mechanism, sized for reciprocating axial movement along the inside surface or outside surface of the nozzle, said mechanism being movable from a first upper position wherein the upper set of one or more through holes on the nozzle are blocked and the lower set of one or more through holes on the nozzle are open and in fluid communication with the bed space, and a second lower position wherein the upper set of one or more through holes on the nozzle are in fluid communication with the bed space via the first filter, and the lower set of one or more through holes on the nozzle are blocked; and one or more sealing means positioned between the first adaptor and the nozzle, the nozzle and the first filter.

In accordance with further embodiment of the present invention there is provided a movable plug having a set of one or more through holes corresponding in their position to the upper set of one or more through holes on the nozzle wherein, when the movable plug is in the second lower position, the set of one or more through holes on the nozzle align with the set of one or more through holes on the movable plug.

In accordance with further embodiment of the present invention there is provided a movable sleeve having a set of one or more through holes such that when the movable sleeve is in the upper position the set of one or more through holes on the movable sleeve are blocked by the first adaptor while the nozzle set of one or more through holes/windows are open, and when the movable sleeve is in the lower position, the set of one or more through holes on the movable sleeve is open and in fluid communication with the bed through the first filter, and the set of one or more through holes/windows on the nozzle are blocked.

In accordance with further embodiment of the present invention there is provided the use of a chromatography column, comprising the dual-purpose valve assembly as described herein.

In accordance with yet a further embodiment of the present invention there is provided a pre-packed chromatography column, comprising the dual-purpose valve assembly as described herein.

In accordance with yet an additional embodiment of the present invention there is provided a method of packing a chromatography column having the dual-purpose valve assembly as described herein.

In accordance with yet an additional embodiment of the present invention there is provided a method of manufacturing a chromatography column having the dual-purpose valve assembly as described herein.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

FIG. 1 is a three-dimensional schematic showing a longitudinal sectional view of a chromatography column as known in the prior art US 2008/0017579 A1.

Figure 2A:
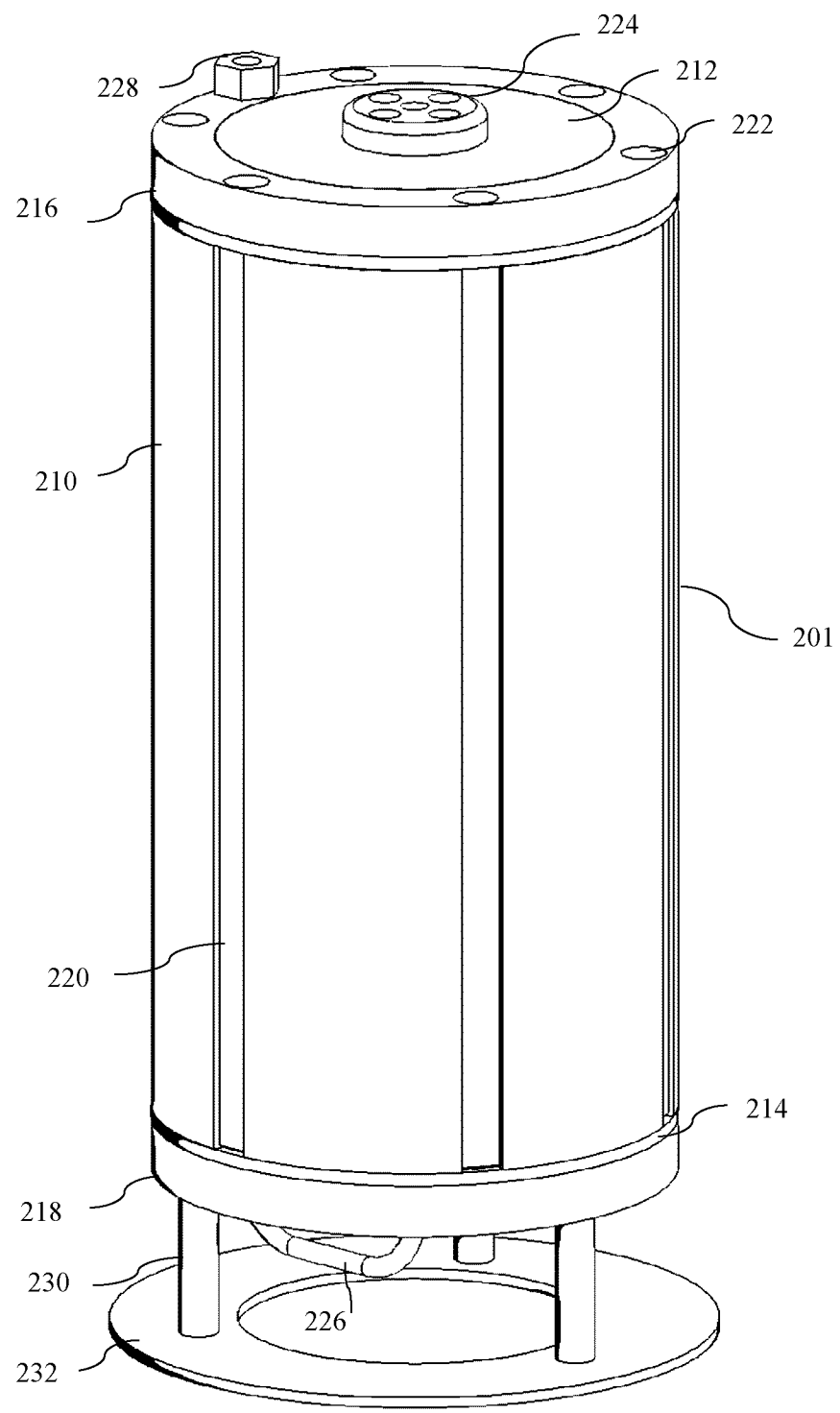
FIG. 2A is a three-dimensional schematic of a chromatographic column of an embodiment of the present invention.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

FIG. 1 shows a schematic cross-sectional view of a column in accordance with the prior art (US2008/0017579A1). The column 101 comprises a tubular housing 111 which is secured to a first end unit 112 and a second end unit 113 by means of tension rods 114, thus defining a bed space 109. The housing 111 and end units 112, 113 are typically composed of stainless steel or a high-strength plastic material such as polypropylene. Tension rods 114, with heads 116, secure the end units 112, 113 to the side wall 111 to form a fluid-tight bed space 109 which is capable of withstanding high operating pressures.

The column can be packed with particulate medium in the form of a slurry through valve means 120, the valve means 120 comprising a central bore 121 and a longitudinal member 122 having a passageway therein, and nozzle 124. In FIG. 1 the nozzle 124 is shown in its retracted position, but it will be moved to a position within the bed space 109 to facilitate filling of the column. However, after the column is filled with packing, the nozzle is retracted to a closed position, which then creates a void volume at the top of the column. Void volume is a crucial problem for a packed bed as it will create instability in the packed bed as the resin particles may move around and disturb the uniformity of the packed bed. This leads to problems in the analyte flow especially when the bed void volume is close to the analyte inlet valve.

According to patent application US2008/0017579A1, an open/closed functionality at the packing valve and nozzle is achieved using a nozzle that is fixed in the bed space (and thereby not retractable) and located adjacent to a movable element or sleeve on the inside or outside of the nozzle that opens and/or closes the nozzle depending on its position. This description is vague and is not illustrated further in the application.

Another drawback of using a separate valve and nozzle for packing the bed is that once packing is finished and the nozzle is retracted, longitudinal member 122 will be filled with resin slurry which makes it hard to clean. This can lead to bacteria build up inside the longitudinal member 122 region and contamination of the column.

Filters 104 are each positioned on the interior face of the end units 112, 113 and act with the side wall 111 to define the bed space 109 and also to prevent leakage of particulate medium from the bed space 109. A distribution channel 106 is located transversely across the face of the first end unit 112 and is in fluid communication with filter 104. The fluid distribution channel facilitates radial distribution of the liquid. The distribution channel 106 comprises a circumferential groove 106a in the face of the first end unit. The groove is positioned such that it effects the circumferential distribution of liquid emanating from outlet 137 of first port 133 uniformly around nozzle 124.

Mobile phase exiting the outlet 137 into the bed space 109 will be distributed evenly across the distribution channel 106, pass through filter 104 and then be eluted uniformly through the bed of particulate medium. The mobile phase will finally exit the column through second port 140. The asymmetric configuration of outlet 137 relative to the distribution channel 106 simplifies the design requirements in producing end unit 112 and thus reduces manufacturing costs.

However, the presence of the mobile phase valve and nozzle 122, 124 in the centre of the distribution channel blocks the access of the analyte(s) to the centre of the column. This will result in poor and nonhomogeneous distribution of the analyte(s) in the centre of the column. As the analyte(s) flows down axially, the distribution in the centre will worsen. Non uniform distribution leads to low separation efficiency of the packed bed, as the analyte will not come in contact with a significant portion of the particles.

The column may be operated in either a "downflow" mode, as described above, or in an "upflow" mode where the direction of flow of the mobile phase is reversed such that it moves up the column. In upflow mode, mobile phase will enter the column via second port 140, move upwards through the bed of particulate medium, and exit the column and be collected via first port 133.

As demonstrated in FIG. 1, second port 140 comprises a passageway 142 which extends vertically through end unit 113 and exits on the opposing, exterior face of the unit. In another embodiment (not shown) the second port 140 exits through a lateral face of unit 113; this configuration allows, by means of appropriate connectors or hollow members (not shown), the collection of mobile phase/liquid at the same elevation as that at which it is applied to the column. The application and collection of mobile phase at the same elevation on a single end unit simplifies use, in terms of operator access and handling, reduces the risk of air accessing the system and decreases the space necessary to set up the column.

FIG. 2A shows schematically the general components of a chromatography column 201 of an embodiment of the present invention. The column has a cylindrical fluid-impermeable vessel 210, made of but not limited to metallic or a high-strength/reinforced polymeric material which may be translucent or opaque. The open top and bottom ends of the vessel 210 are closed by first and second end units/adaptors 212, 214. Each adaptor has a fluid impermeable end plate (not shown) that fits into the ends of the cylindrical vessel and seals it. The adaptors 212 and 214 are preferably made of metallic, high-strength engineering plastic material such as polypropylene, or reinforced plastic material. The adaptors are backed up by retaining plates 216 and 218 made of metal or high-strength engineering plastic material or reinforced plastic material, through which tension rods 220 are secured. These tension rods link the first and second adaptors 212 and 214 and support the construction to withstand high fluid pressures in excess of 10 bar.

Each adaptor 212 and 214 has a central through-opening for communication between the exterior of the column and the packing bed space (not shown) defined by the side wall 210 and adaptors 212 and 214. Through the opening of the first adaptor, an inlet port 224 is inserted to direct the flow into the column. Through the second adaptor, a port is inserted (not shown) to collect the flow out of the packed bed space. In this embodiment of the invention, the outlet port is connected to a return tube 226 that directs the flow back to another port 228 located on the top side of the column. The column sits on spacers 230 which are connected to a lower base 232. In another embodiment (not shown), wheels or casters may be added below lower base 232 or may replace spacers 230 and lower base 232. Wheels or casters can be used to aid in the movement of the column.

Figure 2B:
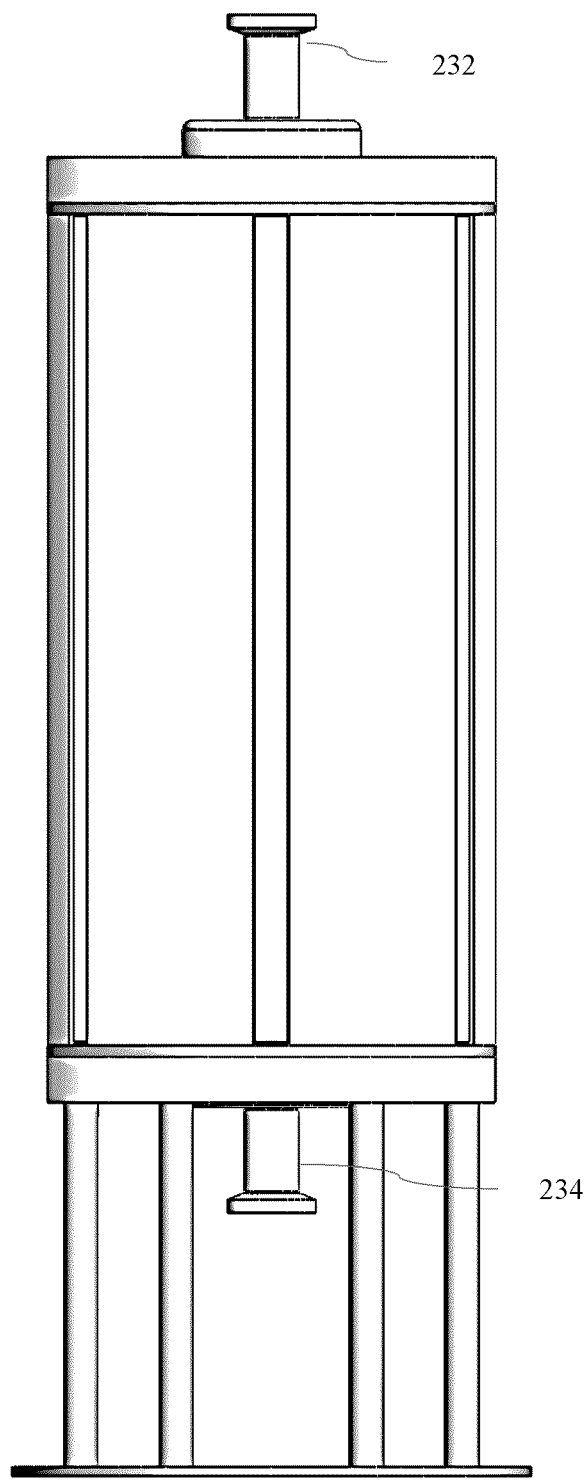
FIG. 2B is a three-dimensional schematic of a chromatographic column of an embodiment of the present invention with a variation of the inlet and exit ports.

FIG. 2B shows a three-dimensional schematic of a chromatographic column of the present invention where the dual-purpose valve has an inlet port 232 that is configured with a sanitary fitting. Outlet port 234 also has a sanitary fitting connection. In this configuration, exit port 234 is in the bottom of the column.

Figure 2C:
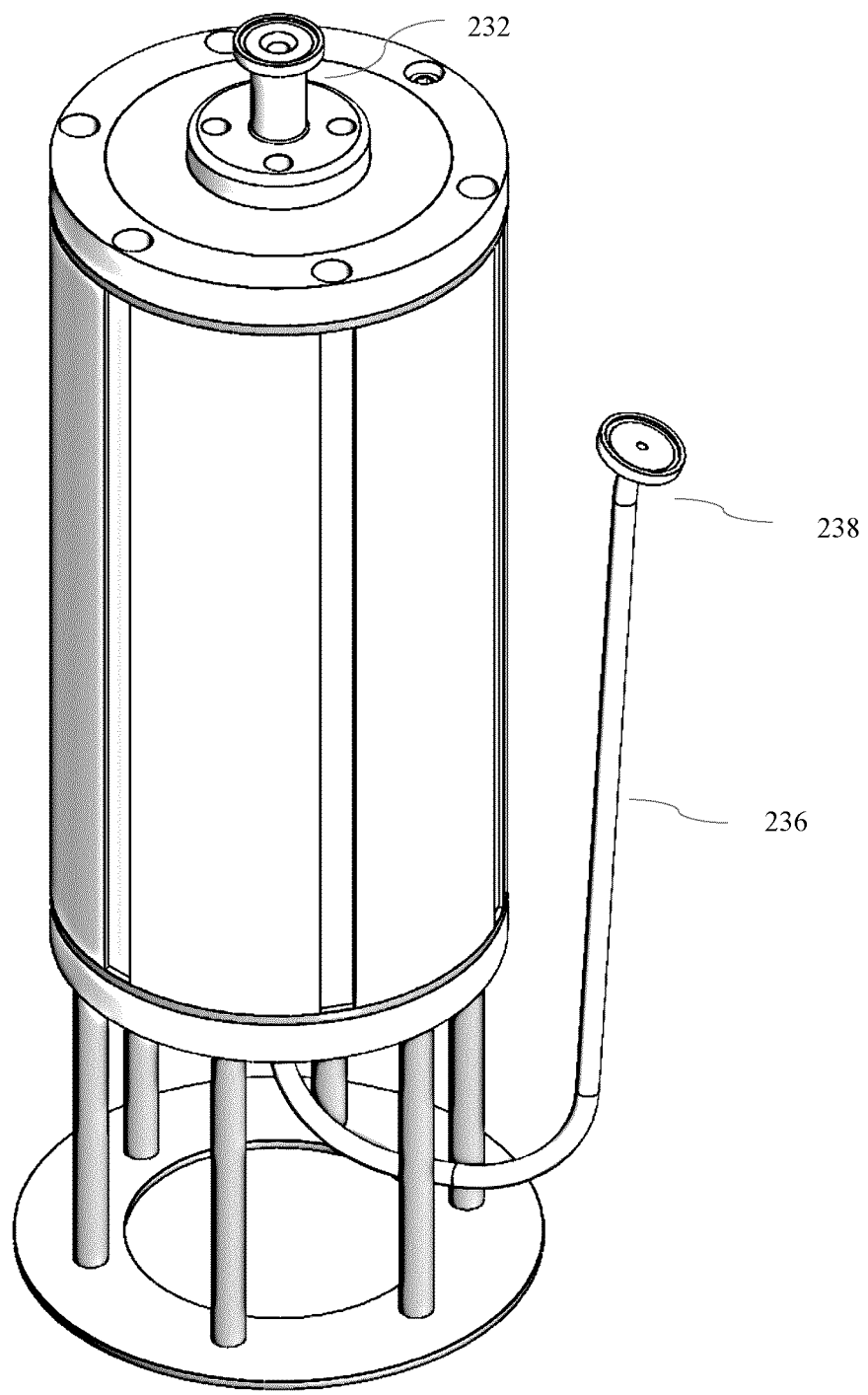
FIG. 2C is a three-dimensional schematic of a chromatographic column of an embodiment of the present invention with another variation of the inlet and exit port.

FIG. 2C shows a three-dimensional schematic of a chromatographic column of the present invention where the outlet port (not shown) is connected to a return tube 236 that directs the flow back to another port 238 located at an elevation below the inlet port 232. In another variation, outlet port 238 is at an elevation similar to or higher than inlet port 232.

Figure 3:
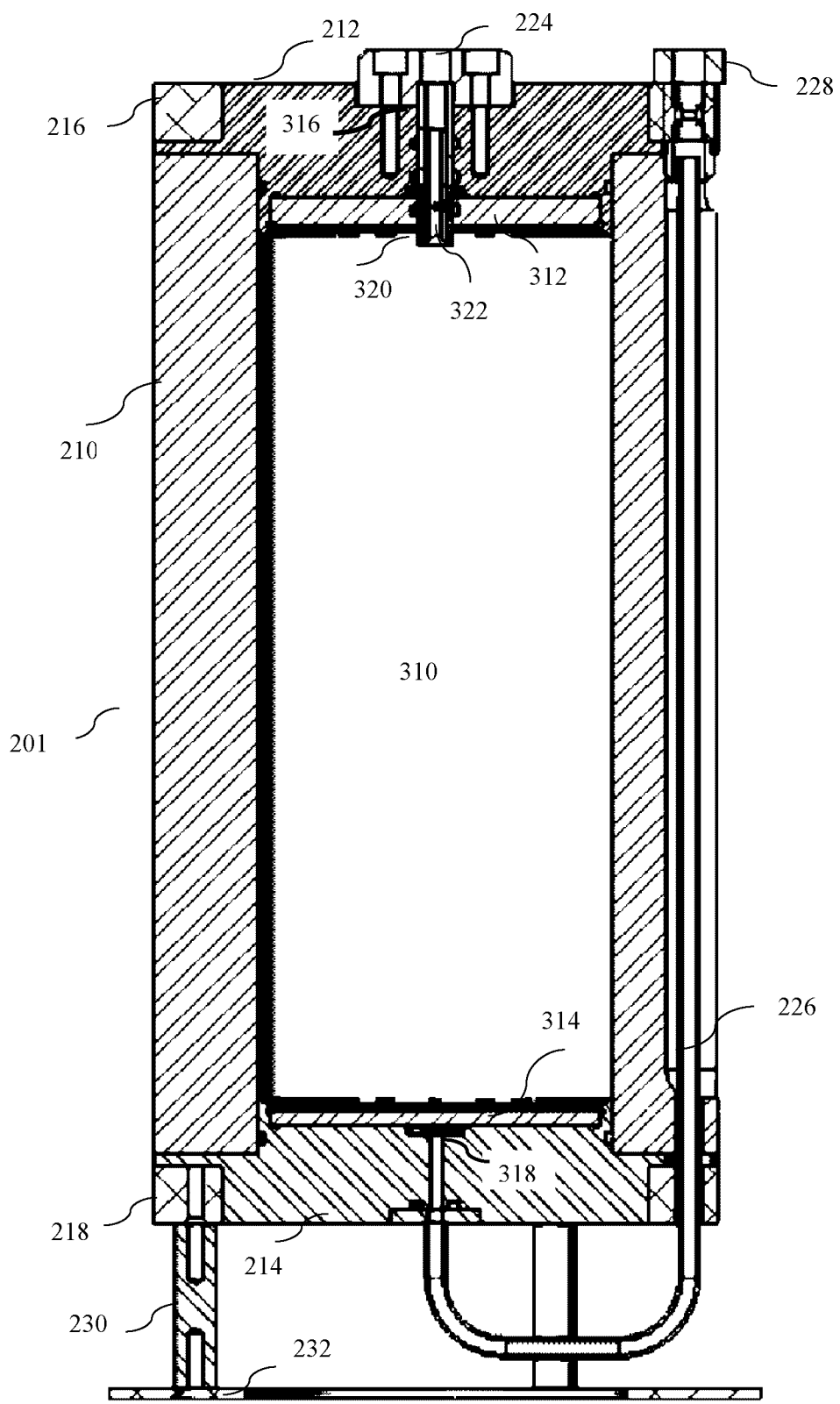
FIG. 3 is a longitudinal sectional view of a chromatographic column of an embodiment of the present invention.

A longitudinal sectional view of a column in accordance with an embodiment of the present invention is shown in FIG. 3. The column 201 comprises a tubular housing/vessel 210 which is secured to an first adaptor 212 and a second adaptor 214 by means of support rings 216 and 218, and tension rods 220, thus defining a bed space 310. The housing 210 and end units 212, 214 are typically composed of but not limited to metallic, a high-strength plastic material such as polypropylene, or reinforced plastic material. In a further embodiment of the invention, where the column is to be used for the separation of biologically active substances, the material is biologically inert such that it does not elicit an immune response in humans in accordance with United States Pharmacopeia (USP)<88> Class VI.

A filter layer 312 and 314, typically of porous or woven plastic or metallic material, extends across the area of the bed space 310 at the inner surface of the adaptors 212 and 214. In a further embodiment of the invention, where the column is to be used for the separation of biologically active substances, the material is biologically inert such that it does not elicit an immune response in humans in accordance with United States Pharmacopeia (USP)<88> Class VI. The inner surface of the adaptors 212 and 214 is recessed behind the filter layer 312 and 314, for instance, conically, to define a distribution channel in between them (not shown).

Inlet port 224 is connected to a hollow nozzle 320 that projects inwardly through the centre opening of the first adaptor 212 and filter 312. The nozzle 320 governs the communication of the inlet port directly to the bed space 310, through a hollow movable plug 322, i.e. bypassing the filter 312. In another position of the movable plug 322, the nozzle governs communication between the inlet port 224 and the space above filter 312. The inlet port 224 with the nozzle 320 and movable plug 322 comprise the dual-purpose valve 316 that has dual use for packing the column with slurry resin in addition to running analyte(s) through the chromatography column. The dual-purpose valve can be made of metallic, plastic, or reinforced plastic material. In a further embodiment of the invention, where the column is to be used for the separation of biologically active substances, the material is biologically inert such that it does not elicit an immune response in humans in accordance with United States Pharmacopeia (USP)<88> Class VI.

Underneath the second filter layer 314, an outlet port 318 collects the flow and directs it through return tube 226 to port 228.

In a typical operation of the column, a packed bed of particulate stationary phase material fills the bed space 310 between the first and second filters 312 and 314.

Figure 4:
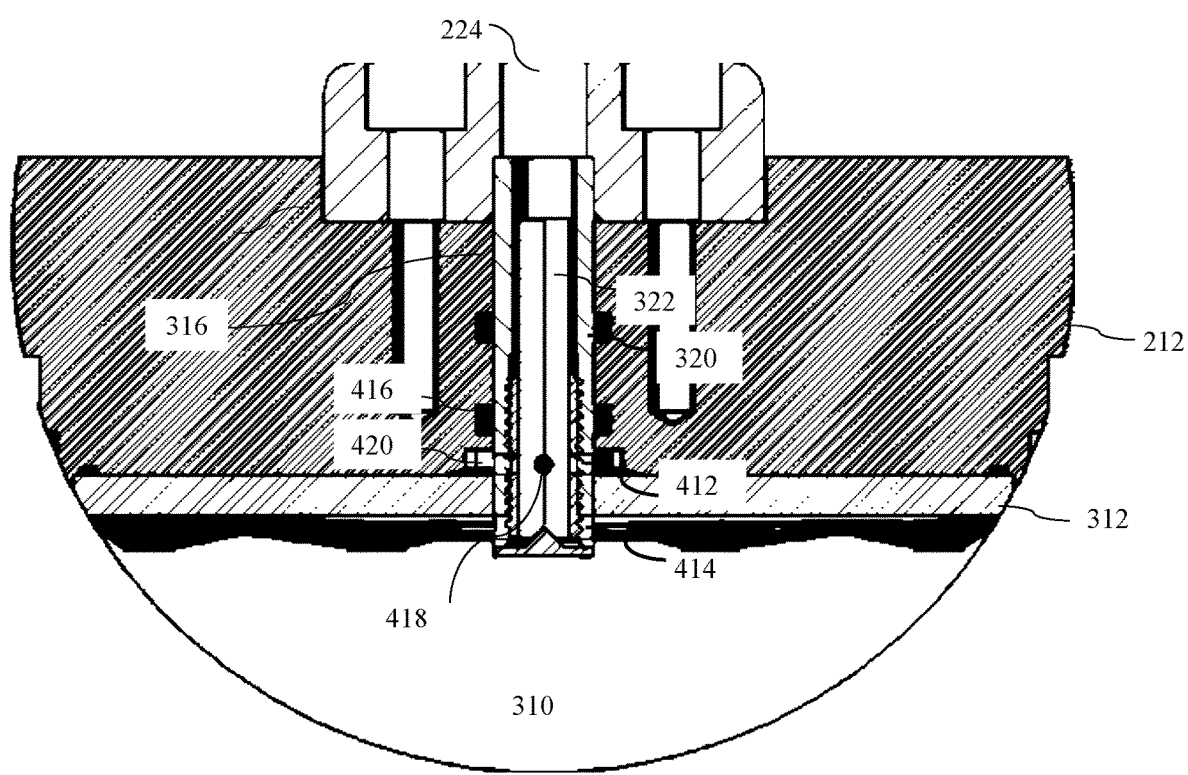
FIG. 4 is longitudinal sectional view of the dual-purpose valve of an embodiment of the present invention as it fits in the chromatographic column.

FIG. 4 shows a longitudinal sectional view of the dual-purpose valve 316 of an embodiment of the present invention as it fits in the chromatographic column. The valve is comprised of the following; the inlet port 224 which sits on the first adaptor 212, the hollow nozzle 320 which passes through the first adaptor 212 cavity and is closed on the bottom end, and the internal movable plug 322. The nozzle 320 has two sets of through holes on its surface positioned in an orbital (or other) fashion at positions 412 and 414. The upper set of holes 412 may typically but not necessarily have a diameter smaller than the lower set of holes 414. The number of holes in each set can typically vary from one hole or more. Upper holes 412 are located above the filter 312, while holes 414 are located underneath filter 312. The movable plug 322 has a hollow centre throughout the axial direction. The movable plug can be placed in an upper position, where it blocks holes 412 on the nozzle 320 and opens holes 414, thus granting access between the inlet port 224 and the packed bed space 310. The movable plug 322 has only one set of holes, 418. In the lower position of the movable plug 322, the movable plug blocks holes 414 on the nozzle 320, while holes 418 on the movable plug align with the upper holes 412 of the nozzle, therefore, allowing access between the inlet port 224 and the distribution area 420 on top of filter 312. In another embodiment of the movable plug, it is shorter in length and does not have any orbital (or other) through holes. The movable plug can be placed in an upper position, where it blocks holes 412 on the nozzle 320 and opens holes 414, thus granting access between the inlet port 224 and the packed bed space 310. In the lower position of the movable plug 322, the movable plug sits completely below upper holes 412 thus blocks holes 414 on the nozzle 320, while upper holes 412 of the nozzle are open, therefore, allowing access between the inlet port 224 and the distribution area 420 on top of filter 312.

The movable plug can be moved up and down. This movement can be achieved by various means known to those with skill in the art including, but not limited to, inserting a tool inside the plug, such as but not limited to a hexagonal key. The movement can be controlled by different means, such as but not limited to guiding rails or outer threads on the movable plug 322, that match with guiding grooves or internal threads on the nozzle 320.

The space between nozzle 320 and the first adaptor 212 is sealed by sealing means in the first adaptor at positions 416.

When the movable plug 322 is in the upper position, the bed can be packed by pumping a resin slurry through the dual-purpose valve 316 through holes 414 to fill up bed space 310. Upon completion of bed packing, the movable plug 322 is moved to the lower position to block holes 414 and open holes 412.

In prior art (patent application US2008/0017579A1), the slurry packing valve is retracted after packing the column, leaving void volume in the centre of the upper region of the packed bed. The overall design of the present invention overcomes this drawback. This is accomplished since the nozzle 320 is fixed in place and does not retract after packing, the packed bed around the dual-purpose valve 316 will not be disturbed and will eliminate any potential voids.

A mobile phase can then be fed in the "upward" flow direction through port 228 which will travel through the packed bed space 310, followed by the first filter 312, and then through holes 412 and up through the hollow movable plug 322, nozzle 320 and exit through port 224. This will backflush all the resin slurry inside the dual-purpose valve 316. From our experimental evaluation, the valve was completely flushed out of resin slurry after 30 mL of upward flow. The backflushing of residual resin slurry is a unique and novel feature of many embodiments of the invention which is lacking in the prior art (patent application US2008/0017579A1). This feature is very critical, as residual resin in the packing valve is prone to bacterial growth.

After backflushing, mobile phase can be pumped through the inlet port 224, which will go through nozzle 320, hollow movable plug 322, then out through upper holes 412 into the distribution channel 420. The mobile phase will distribute outwardly and travel through filter 312 to elute through the packed bed. The mobile phase passes through the second filter 314 of the second adaptor 214 and out through the outlet port 318 for collection.

With the dual-purpose valve design of embodiments of this invention, the mobile phase and analyte(s) distribution is not blocked in the centre by a second valve, which is the drawback of previous prior art (patent application US2008/0017579A1). When access to the centre of the packed bed is blocked at the start of the bed, the centre of the bed will have less contact with the analyte(s) and will lead to non-uniform fluid distribution.

While the above describes examples of "downflow" chromatography, where chromatographic separation is affected by the downward movement of the mobile phase through the column, the skilled person will understand that separation may alternatively be achieved by "upflow" chromatography, simply by pumping mobile phase upwards through the column and thus reversing the direction of flow. In this later mode, mobile phase would flow through port 228, then return tube 226, then would enter the column at port 318, move upwards through the packed bed of resin particles, and be collected from port 224 at the upper side of the column.

Figure 5:
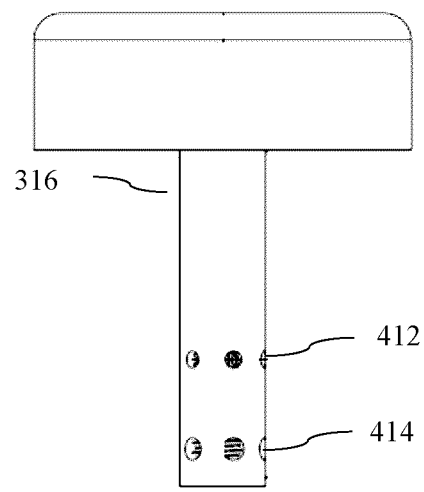
FIG. 5 is a schematic of the dual-purpose valve of an embodiment of the present invention.

FIG. 5 shows a schematic of the outer body of the dual-purpose valve of an embodiment of the present invention. Holes 412 are for mobile phase flow, while holes 414 are flow holes for the resin slurry packing. The diagram represents the valve in the running position, where the resin slurry holes are blocked by the movable plug 322.

While the dual-purpose valve of the present invention is intended for use in pre-packed disposable columns, it is also applicable to reusable columns. One embodiment of the invention relates to a column design where the dual-purpose valve is installed in two locations including the first adaptor and the second adaptor. The valve features are identical in both positions, where the nozzle has two modes controlled by the position of the movable plug. One position of the movable plug is used for running mobile phase and analyte(s) through the column where the holes 414 on both dual-purpose valves are plugged and holes 412 are open, while the other position can be used for unpacking the column where holes 414 on both dual-purpose valves are open and holes 412 are plugged. To unpack the column, the movable plug in the dual-purpose valves in the first and second adaptors are moved to the packing/unpacking position, where the valve has direct access to the bed space. Extensive mobile phase is then pumped into the bed space to disturb the packed bed and force the resin out of the bed space in the form of resin slurry. Once column is unpacked, the movable plug in the dual-purpose valve in the second adaptor is switched to the running position, while the movable plug in the dual-purpose valve in the first adaptor is kept in the packing position. Resin slurry can then be pumped into the bed space allowing the column to be packed again. The use of the dual-purpose valve for reusable columns enables multiple column unpacking/packing regimes, which offers many advantages including reduced disassembling and set up time, and maintains the column in aseptic conditions.

It will be understood that a wide range of column capacities is possible, typically ranging from 0.01 to 2000 liters. Preferred capacities when using the column as a disposable column are in the range of 0.01 to 500 liters.

The concept of dual-purpose valve has been applied to reusable columns, where the column is packed, unpacked, and repacked again with the same or different type of resin (U.S. Pat. No. 6,524,484B2 and U.S. Pat. No. 8,585,894B1). In these designs, the valve hardware was complicated, and costly to fabricate. This was not an issue for reusable columns, as the cost of fabrication is justified over the usage of the column. But for disposable columns, where they are intended for limited time use, cost of fabrication has to remain efficient, and therefore, a simple design is required. While prior art (US2008/0017579A1) replaced the dual-purpose valve with two valves in order to reduce cost, important features including the uniformity of distribution, stability of the packed bed, the absence of void volume, and the prevention of bacterial contamination/growth was not accomplished. The present invention is a solution addressing the shortcoming of previously designed two-valve chromatography column and the high fabrication cost of a dual-purpose valve.

The present invention requires very precise fabrication of the different components of the valve, especially the nozzle 320 and the movable plug 322. Since sealing of holes 412 and 414 is done by the movable plug 322. In addition, holes 418 on the movable plug 322 must match holes 412 when the movable plug is in the bottom position (mobile phase running position). Additionally, the outer diameter of nozzle 320 has to be minimized for better distribution of the analyte(s). At the same time, the inner diameter of nozzle 320 and movable plug 322 must be maximized in order to increase the surface area for the flow to accommodate high flow rates. Concurrently, the wall thickness of the movable plug must withstand the pressure and accommodate the fabrication of holes and the outer threads. Optimizing all these dimensions was challenging and required advanced engineering and manufacturing. The current fabrication technologies of small components aided in coming up with an innovative yet simple and cost-efficient design.

In one variation of the design (not shown), the inlet port and nozzle are part of the adaptor itself and has two sets of holes: upper holes and lower holes. A movable plug is an additional part and is inserted in the nozzle and can be placed in two different positions to either plug the upper holes for packing or the lower holes for running mobile phase and analyte(s).

Figure 6A:
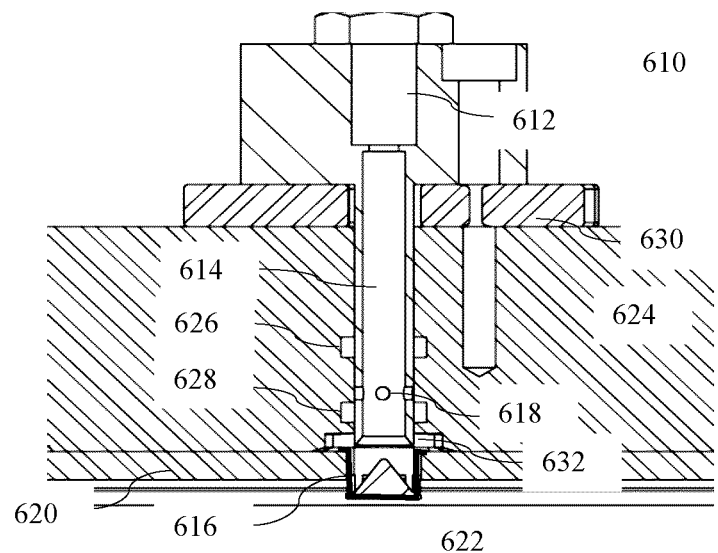
FIGS. 6A, 6B, 6C, and 6D show a longitudinal sectional view of variations of the dual-purpose valve nozzle of an embodiment of the present invention.
Figure 6B:
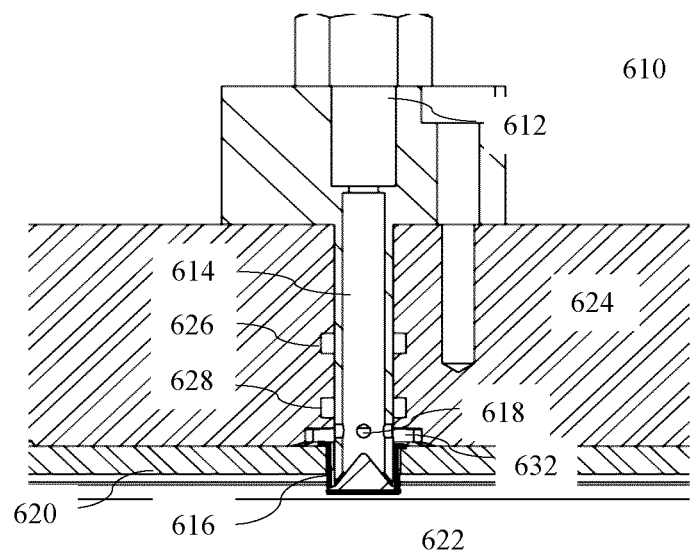

FIGS. 6A and 6B show another variation of the dual-purpose valve design 610 of an embodiment of the present invention. The dual-purpose valve is comprised of an inlet port 612 that is connected to a movable sleeve 614 which has one set of holes 618. Underneath the movable sleeve is a nozzle 616 which is held in place by porous filter 620 and is exposed to the bed space 622. Nozzle 616 has windows/holes to grant access to the bed space 622. The area between the movable sleeve 614 and the first adaptor 624 is sealed by sealing means at locations 626 and 628. In the packing position, inlet port 612 and movable sleeve 614 are in a higher position determined by calibration tool 630 as shown in FIG. 6A, where the nozzle 616 windows/holes directs the flow of slurry resin into bed space 622. FIG. 6B shows the valve in the running position, where the movable sleeve 614 is moved down to a position that plugs nozzle 616 windows/holes and the flow of mobile phase/analyte(s) exits the movable sleeve 614 through holes 618 which are aligned with the distribution channel 632 in the first adaptor 624 above the porous filter 620. This design enables homogenous analyte(s) distribution as the mobile phase/analyte(s) inlet is not blocked by a second valve. Also, the valve can be backflushed after packing, since the same valve is used for packing and running. In addition, once packed, the nozzle is not retracted, eliminating the formation of any void volume in the column. Other benefits of this design include simplicity and cost-efficiency for production. This variation of the dual-purpose valve is well suited for low-pressure applications.

Figure 6C:
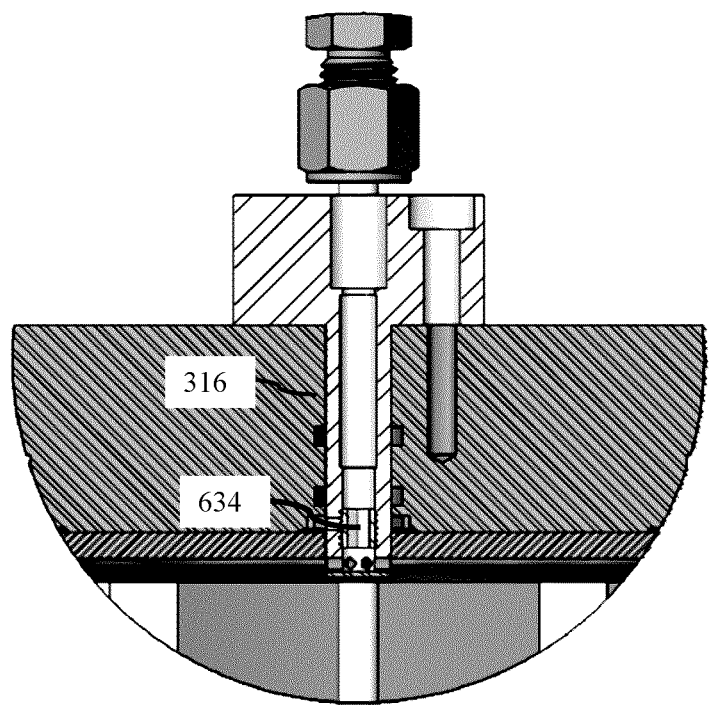

FIG. 6C shows another variation of the dual-purpose valve design 316 of an embodiment of the present invention. In this embodiment, the movable plug 634 does not have any holes and is shorter than the movable plug shown in FIG. 3 and FIG. 4. In the upper position the upper holes on the nozzle are blocked, and in the lower position of the movable plug the lower holes on the nozzle are blocked while the upper holes are open, without the need of having a set of holes on the movable plug that match the elevation of the upper set of holes on the nozzle.

Figure 6D:
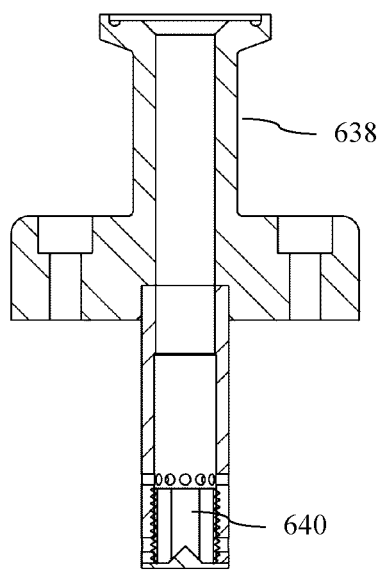

FIG. 6D shows yet another variation of the dual-purpose valve design 316 of an embodiment of the present invention. In this embodiment, the inlet of the valve 638 is a sanitary hose connection style to ease the connection of the column to process equipment. The hose connection style on the dual-purpose valve and the exit port may be varied to different formats to ease the connection of the column to process equipment. In this embodiment, the movable plug 640 does not have any holes and is shorter than the movable plug shown in FIG. 3 and FIG. 4. In the upper position of the movable plug the upper holes on the nozzle are blocked, and in the lower position of the movable plug the lower holes on the nozzle are blocked while the upper holes are open, without the need of having a set of holes on the movable plug that match the elevation of the upper set of holes on the nozzle.

EXAMPLE 1: One of the highlights of the design is the reproducibility of packing. In one packing experiment, a 1 Liter column was packed with a packing medium of cation exchange chromatography resin of 75 μm hydroxylated methacrylic polymer beads that has been functionalized with sulfopropyl (S) strong cation exchange groups. The column had a volume of 1,005 mL, a diameter of 80 mm and a bed height of 20 cm. The column was assembled and filled with deionized water. The dual-purpose valve was set in packing mode, where the lower holes were open and the upper holes were closed. The inlet port on the dual-purpose valve was connected to a peristaltic pump, while the column exit port was connected to a waste line. A pressure gauge was installed between the peristaltic pump and the inlet port to monitor the pressure inside the column. Then 50% resin slurry in 1M sodium chloride was pumped using the peristaltic pump at a speed around 600 mL/min (720 cm/hr) and fed via the dual-purpose valve into the packed bed space through the nozzle's lower holes, while the displaced water exited the column via the waste line. The pressure was monitored throughout the packing process, then once the column was fully packed, the pressure spiked as seen on the pressure gauge. The pump flow was then stopped and the pressure from the pump was released, and the dual-purpose valve was switched to running mode by moving down the movable plug to block the lower holes and open the upper holes. The column was then back flushed by running the column in the "upflow" direction in a mobile phase of 0.5M sodium chloride at a flow rate of 5 mL/min, increased gradually to 20 mL/min. The back-flushing step was essential for cleaning up the valve from any residual resin, to avoid bacteria contamination/growth. The design of the present dual-purpose valve invention allows for back-flushing the valve after packing, which was lacking in the prior art of disposable columns. After about 30 mL of pumped mobile phase, the exit line was completely clear from any remaining resin particle. The column was then switched to "downflow" and equilibrated for 2 column volumes, then an analyte was injected to evaluate the packing asymmetry.

3M sodium chloride (1% of packed bed volume) was used as a traced substance and eluted from the column using a mobile phase of 0.5M sodium chloride at a flowrate of 83 mL/min (100 cm/hr) and was monitored by a conductivity detector. The experiment was done in parallel on another 1 Liter column of the same design. As can be seen from Table 1, excellent reproducibility of packing was observed with the 75 µm cation exchange medium used in multiple independent packing experiments, based on the Asymmetry and Height Equivalent to a Theoretical Plate (HETP) values.

TABLE 1

| Packing Number | Observed Asymmetry | Observed HETP (N/m) | As. Post P/F Test | HETP Post P/F Test (N/m) | Accepted Asymmetry | Accepted HETP (N/m) |
| --- | --- | --- | --- | --- | --- | --- |
| Column 1 | 0.93 | 4,464 | 0.95 | 4,137 | 0.80-1.40 | ~4,000 |
| Column 2 | 0.92 | 4,329 | 0.99 | 4,122 | | |

Figure 7:
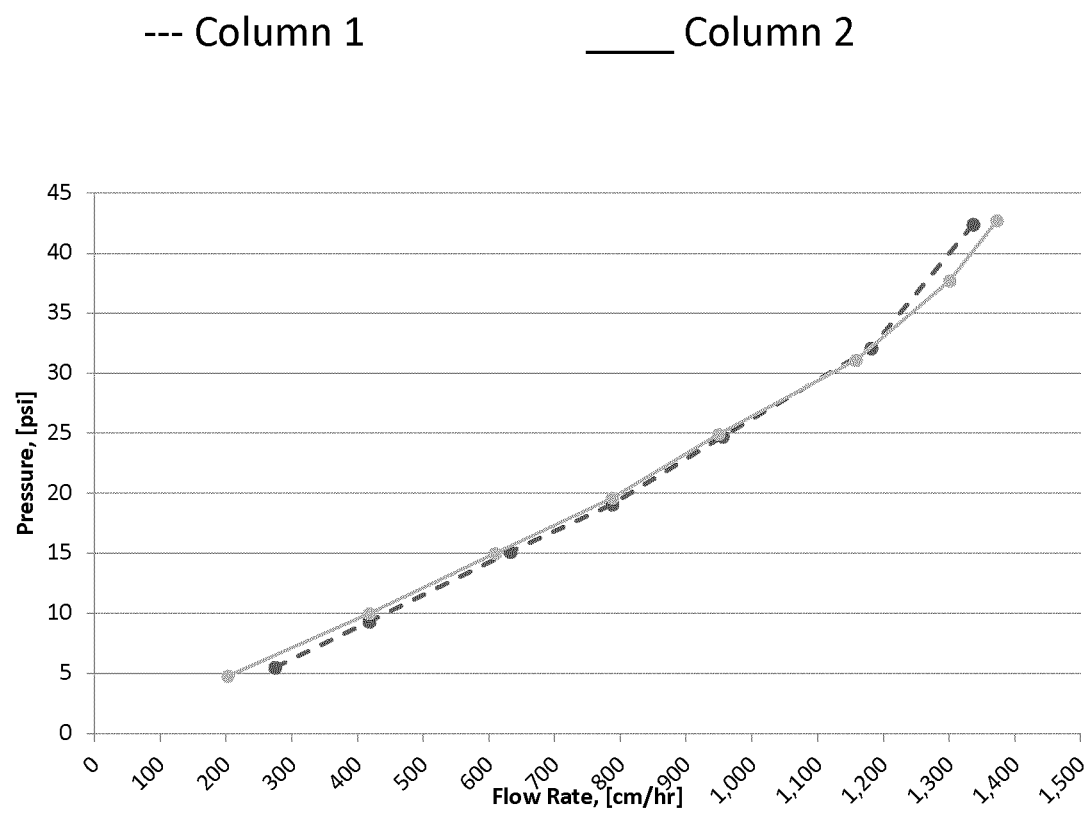
FIG. 7 shows the pressure-flow testing curve on a chromatography column with the dual-purpose valve of an embodiment of the present invention.

EXAMPLE 2: FIG. 7 shows a pressure-flow test done on the two columns after the first asymmetry test was performed. The pressure-flow curves match the expected curve shape for this type of resin. The two columns were then injected again with another 3M sodium chloride (1% of packed bed volume) analyte to check asymmetry after the pressure-flow test. Asymmetry and HETP values after the pressure-flow test were very similar to the values prior to the pressure-flow tests, confirming the bed was packed tightly and uniformly.

The reproducibility of Asymmetry and closeness to 1.00 confirms efficiency of packing, uniformity of the packed bed, and efficient distribution of the analyte(s) owing it to the design of the dual-purpose valve where packing and running analyte(s) is accomplished through a central nozzle, where the analyte(s) is not obstructed by other valves in the centre of the column, and the column is free of any void volume.

EXAMPLE 3: The dual-purpose valve has been tested and proven to work with many types of resins. A 1 Litre chromatography column was packed and run using the dual-purpose valve in a hydrophobic interaction chromatography (HIC) resin that has a particle size of 65 µm. It has also been tested with a cation exchange resin, with a particle size of 75 µm. Also, the dual-purpose valve was tested with a resin of protein A ligand bound to a hydroxylated methacrylic polymer base bead for Size Exclusion Chromatography, with a particle size of 45 µm. Asymmetry and HETP passed for all the resin types, and the packing was found to be very reproducible. Other resins can be packed in a chromatography column and run using the dual-purpose valve, including anion exchange, size exclusion, affinity, mixed-mode, protein L, and other resins having a wide range of particle sizes and compressibility and manufactured by different vendors. Other sizes of chromatography columns, such as 3 L, 6 L and others, were also packed successfully using the dual-purpose valve. This proves that the dual-purpose valve can be scaled up or down to accommodate a wide variety of sizes.

Different embodiments of the present invention include, but are not limited to, different Column Inner Diameters, ranging from few centimeters to over a meter. For each column ID, the bed height can vary from few centimeters to over a meter.

Also, in addition to the above, it is possible to use the column hardware and dual-purpose valve for continuous chromatography where the Bed Height is much smaller than the column ID.

As discussed, a further embodiment is the use of the dual-purpose valve for reusable columns, where another dual-purpose valve is installed in the second adaptor, to enable the column to be unpacked, cleaned, and repacked, without having to disassemble the whole column.

Therefore, our objectives for an easier, faster, consistent packing throughout the column, consistent packing from column-to-column, independence from human skill factors, were successfully achieved and confirmed.

The embodiments of the invention as defined above provide a chromatography column that achieves a consistent packed bed throughout the whole column. Packing is quick and consistent, column-to-column. It achieves good distribution of the analyte(s) throughout the whole column. It is a scalable design (i.e. can be modified for smaller or larger volumes) and it can run at operating pressure up to 3 bars and tolerate higher pressures (up to 10 bar).

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A dual-purpose valve assembly for use in a chromatography column, said chromatography column having a first adapter adjacent to a first filter, a second adaptor adjacent to a second filter, and a side wall that extends between the first and second adapters thereby defining a bed space, said dual-purpose valve assembly comprising:

an inlet port which is positioned on the first adaptor of said chromatography column, and an outlet port which is positioned on the second adapter of said chromatography column;

a hollow nozzle, connected to the inlet port, said nozzle having an inside surface and an outside surface, said nozzle passing through the first adaptor and through the adjacent first filter, said nozzle having an upper set of one or more through holes above the first filter and a lower set of one or more through holes below the first filter, and a closed bottom end;

a moveable mechanism that is movable between a first upper position wherein the upper set of one or more through holes on the nozzle are blocked and the lower set of one or more through holes on the nozzle are open and in fluid communication with the bed space, and a second lower position wherein the upper set of one or more through holes on the nozzle are open and in fluid communication with the bed space via the first filter, and the lower set of one or more through holes on the nozzle are blocked; and one or more sealing means positioned between the first adaptor and the nozzle and between the nozzle and the first filter.

2. The dual-purpose valve assembly of claim 1, wherein the moveable mechanism is a moveable plug sized for reciprocating movement on the inside of the hollow nozzle.

3. The dual-purpose valve assembly of claim 1, wherein the moveable mechanism is a moveable sleeve sized for reciprocating movement on the outside of the hollow nozzle.

4. The dual-purpose valve assembly of claim 1 further comprising a hose connection on each of the inlet port and the outlet port for connecting the chromatography column to process equipment.

5. The dual-purpose valve assembly of claim 1, wherein the upper set of one or more through holes on the nozzle each are circular and have a diameter smaller than a diameter of each of the through holes of the lower set of one or more through holes on the nozzle.

6. The dual-purpose valve assembly of claim 1, wherein the movable mechanism can be moved between said first upper position and said second lower position using a tool.

7. The dual-purpose valve assembly of claim 1 further comprising one of i) guiding rails or ii) outer threads on the movable mechanism that cooperate with guiding grooves or internal threads on the nozzle to guide, the moveable mechanism between said first upper position and said second lower position.

8. The dual-purpose valve assembly of claim 1, wherein each of the one or more sealing means are O-rings.

9. A pre-packed chromatography column comprising the dual-purpose valve assembly of claim 1 and a chromatography column that is packed with a particulate chromatography resin, the dual-purpose valve assembly attached to a top of the chromatography column.

10. A dual-purpose valve assembly for use in a chromatography column, said chromatography column having a first adapter adjacent to a first filter, a second adaptor adjacent to a second filter, and a side wall that extends between the first and second adapters thereby defining a bed space, said dual-purpose valve assembly comprising:

an inlet port which is positioned on the first adaptor of said chromatography column, and an outlet port which is positioned on the second adapter of said chromatography column;

a hollow nozzle, connected to the inlet port, said nozzle having an inside surface and an outside surface, said nozzle passing through the first adaptor and through said first filter, said nozzle having an upper set of one or more through holes above the first filter and a lower set of one or more through holes below the first filter, and a closed bottom end;

one of: i a moveable plug sized for reciprocating axial movement along the inside surface of the nozzle; or ii) a movable sleeve sized for reciprocating axial movement along an outside surface of the nozzle, each of said movable plug or movable sleeve being movable from a first upper position wherein the upper set of one or more through holes on the nozzle are blocked and the lower set of one or more through holes on the nozzle are open and in fluid communication with the bed space, and a second lower position wherein the upper set of one or more through holes on the nozzle are open and in fluid communication with the bed space via the first filter and the lower set of one or more through holes on the nozzle are blocked; and one or more sealing means positioned between the first adaptor and the nozzle and between the nozzle and the first filter.

11. The dual-purpose valve assembly of claim 10, comprising i) the moveable plug and wherein the moveable plug is sized for reciprocating movement on the inside of the nozzle.

12. The dual-purpose valve assembly of claim 11, wherein said movable plug has a set of one or more through holes corresponding in their position to the upper set of one or more through holes on the nozzle wherein, when the movable plug is in the second lower position, the lower set of one or more through holes on the nozzle align with the set of one or more through holes on the movable plug.

13. The dual-purpose valve assembly of claim 10, comprising ii) the moveable sleeve and wherein the moveable sleeve is sized for reciprocating movement on the outside of the nozzle.

14. The dual-purpose valve assembly of claim 13, wherein said movable sleeve has a set of one or more through holes such that when the movable sleeve is in the upper position the set of one or more through holes on the movable sleeve are blocked by the first adaptor while the lower set of one or more through holes on the nozzle are open, and when the movable sleeve is in the lower position, the set of one or more through holes on the movable sleeve is open and in fluid communication with the bed through the first filter, and the upper set of one or more through holes on the nozzle are blocked.

15. A chromatography column comprising:

a side wall;

axially spaced first and second adaptors positioned opposed to each other and being separated by said side wall;

a first filter, which is adjacent to said first adaptor, and a second filter, which is adjacent to said second adaptor, wherein said first and second filters together with the side wall define an enclosed bed space for containing a bed of particulate medium therein;

an inlet port positioned on the first adapter;

an outlet port positioned on the second adapter, configured to collect analyte;

a hollow nozzle, connected to the inlet port, said nozzle having an inside surface and an outside surface, said nozzle passing through the first adaptor and first filter, said nozzle having an upper set of one or more through holes above the first filter and a lower set of one or more through holes below the first filter, and a closed bottom end;

one of i) a moveable mechanism sized for reciprocating axial movement along the inside surface of the nozzle, or ii) a moveable mechanism sized for reciprocating axial movement along the outside surface of the nozzle, each moveable mechanism being moveable from a first upper position wherein the upper set of one or more through holes on the nozzle are blocked and the lower set of one or more through holes on the nozzle are open and in fluid communication with the bed space, and a second lower position wherein the upper set of one or more through holes on the nozzle are in fluid communication with the bed space via the first filter and the lower set of one or more through holes on the nozzle are blocked; and one or more sealing means positioned between the first adaptor and the nozzle and between the nozzle and the first filter.

16. The chromatography column of claim 15, wherein each of the sealing means are O-rings.

17. The chromatography column of claim 15, wherein each moveable mechanism has a set of one or more through holes corresponding in their position to the upper set of one or more through holes on the nozzle wherein, when the moveable mechanism is in the second lower position, the set of one or more through holes on the nozzle align with the set of one or more through holes on the moveable mechanism.

18. The chromatography column of claim 17, wherein the moveable mechanism is a plug sized for reciprocating movement on the inside of the nozzle.

19. The chromatography column of claim 17, wherein the moveable mechanism is a sleeve sized for reciprocating movement on the outside of the nozzle.

* * * * *